United States Patent [19]
McNair et al.

[11] Patent Number: 5,304,782
[45] Date of Patent: Apr. 19, 1994

[54] PROTECTION CIRCUIT FOR ELECTRIC TOASTER

[75] Inventors: John D. McNair, Olinda; Alk P. Cheah, Clayton South, both of Australia

[73] Assignee: Black & Decker Inc., Newark, Del.

[21] Appl. No.: 26,959

[22] Filed: Mar. 5, 1993

[30] Foreign Application Priority Data

Mar. 6, 1992 [AU] Australia .............................. PL1236

[51] Int. Cl.⁵ .............................................. H05B 1/02
[52] U.S. Cl. ................................... 219/518; 219/491; 219/493; 219/519; 219/497; 99/329 R
[58] Field of Search ............... 219/491, 493, 494, 492, 219/497, 501, 505, 508, 509, 511; 99/329 R, 329 P, 329 RT

[56] References Cited

U.S. PATENT DOCUMENTS

| | | | |
|---|---|---|---|
| 4,092,520 | 5/1978 | Holmes et al. | 219/504 |
| 4,188,865 | 2/1980 | Bjarsch. | |
| 4,395,621 | 7/1983 | Parker | 219/492 |
| 4,687,906 | 8/1987 | Fujishima et al. | 219/364 |
| 4,755,656 | 7/1988 | Charlesworth et al. | 219/492 |

FOREIGN PATENT DOCUMENTS 1400429 7/1975 United Kingdom.
1573012 8/1980 United Kingdom.

*Primary Examiner*—Mark H. Paschall
*Attorney, Agent, or Firm*—Barry E. Deutsch

[57] ABSTRACT

An electric toaster that enables power to be disconnected from the heating elements upon completion of a toasting cycle regardless of the position of the main product supporting the carriage in the toasting compartment. The toaster has an electromagnetic latch and an auxiliary member carried by the main carriage which is movable relative to the main carriage. The auxiliary member is urged by biasing member to move in a direction away from the electromagnetic latch but able to be held thereby when the latch is activated. The auxiliary member also is arranged to close main power supply contacts to supply power to the heating elements when the auxiliary member is held by the latch, but to open said main supply contacts when the auxiliary member moves away from the latching means under action of the biasing member. The toaster may also include a sensor to sense abnormal conditions in the toaster to disconnect power from the heating elements when such abnormal conditions occur.

16 Claims, 3 Drawing Sheets

PROTECTION CIRCUIT FOR ELECTRIC TOASTER

BACKGROUND OF THE INVENTION

The present invention relates to protection devices for preventing electric shocks by misuse of domestic appliances used in the home and more particularly to such devices used in electric toasters.

It is well recognized that if certain electric appliances are misused, electric shocks can result with the possibility of injuries. One typical situation of this type is where a person uses a metal (conductive) object such as a knife or fork to try to remove an object being toasted in a toaster that may have become jammed or wedged in the toaster while the toaster remains actively connected to a power source. While this danger is well recognized, unfortunately it still happens that injuries do occur by such misuse of toasters and other appliances.

Commonly in toasters the main carriage for supporting a bread slice (or the like) is capable of being moved downward to a toasting position against a main carriage spring force. The carriage is latched by some means in the toasting position for a desired toasting cycle whereupon, in normal cycle, the latching means releases the main carriage and the toasted product is carried upwardly under action of the main carriage spring. Normally, the movement towards the toasting position of the main carriage causes main electrical contacts (normally open) to be closed to supply power to the toasting elements. Release of the latching means and normal upward movement of the carriage as a result of the main carriage spring breaks these contacts to discontinue power to the toasting elements. The latching means might be some form of mechanical latching but such arrangements are not preferred in that they may remain latched if a general power failure occurs. Generally a more preferred form of latching is to use an electromagnet to retain the main carriage in the down or toasting position. In these arrangements, the carriage trips the main power contacts closed on its downward movement to supply power to the electromagnet and to the elements simultaneously with the power supply to the electromagnet and to the elements simultaneously with the power supply to the electromagnet being thereafter controlled by a suitable control means (e.g. a simple timer or a color control (browness device) to control the toasting cycle length. At the end of the cycle, power is removed from the electromagnet and the main carriage is released upwardly thereby also breaking the main power supply contacts. The foregoing of course describes "normal" operation of toasters. Unfortunately, occasions do arise where the main carriage might remain jammed or held (intentionally or otherwise) in its lowered position where the main power contacts remain closed resulting in the toasting elements staying in an electrically "live" condition even though a toasting cycle has been completed. Such jamming may occur as a result of a bread slice (or similar item) of irregular shape becoming wedged in a position inside the toasting compartment so that the main carriage will not move upward even though the electromagnetic force holding the carriage down has been removed. In other circumstances the carriage itself may become jammed in its lower position due to a mechanical fault or the like or a person might attempt to override the normal controls by simply physically holding the carriage down. Such circumstances can cause many different forms of accidents such as fires as a result of the toasting elements continuing to operate, or if an unthinking person attempts in the heat of the moment, to unblock a jam by inserting into the toasting compartment a conducting element such as a metal knife, fork or the like, that person immediately is at risk of injury. The same risk of course exists during normal operation of a toaster if a young child (or any other person without the requisite knowledge or mental capacity) inserts a conducting element into the toasting compartment while the toasting elements remain live.

The object therefore of the present invention is to provide a toaster control arrangement which will minimize the effect of electric shocks resulting from toaster misuse of the type discussed in the foregoing or will minimize the effect of other abnormal events with use of a toaster. A further preferred objective of the present invention is to provide a means for preventing continued power supply to the toasting elements upon completion of a toasting cycle regardless of the position of the main carriage.

SUMMARY OF THE INVENTION

Accordingly, the present invention provides an electric toaster comprising a toasting compartment, electrically operated heating element, means adapted to direct heat to said toasting compartment when activated, electric power supply means adapted to provide electric power to said heating element means during a toasting cycle, product supporting carriage means adapted to move a product to be toasted into said toasting compartment, latching means to retain said carriage means in a toasting position during said toasting cycle, said carriage means including an auxiliary member carried thereby, said auxiliary member being adapted to activate switch means in said electric power supply means to close said switch means upon moving in a first direction and to open said switch means upon moving in a second direction, and sensor means adapted to detect any abnormal condition in said toasting compartment or said heating element means and in response thereto move said auxiliary member in said second direction to open said switch means.

Conveniently, the auxiliary member is arranged for movement relative to said carriage means and movement in said second direction relative to said carriage means is achieved by biasing means such as a spring element or the like. In one preferred arrangement the sensor means is adapted to detect any abnormal current leakage from the heating element means. Thus, if any abnormal current leakage path is established from either or both toasting elements, such as via insertion of a metal tool (e.g. knife or fork) into the toasting compartment, this will be sensed by the sensor means and power will be immediately withdrawn from the toasting elements by movement of the auxiliary member in said second direction to open the switch means.

In accordance with a second aspect, the present invention also provides an electric toaster comprising a toasting compartment, electrically operated heating means adapted to direct heat to said toasting compartment when activated, electric power supply means adapted to provide electric power to said heating element means during a toasting cycle, product supporting carriage means adapted to move a product to be toasted into said toasting compartment, latching means to retain said carriage means in a toasting position during said toasting cycle, said carriage means including an auxiliary member carried thereby in a manner permitting movement relative to said carriage means, said auxiliary member being adapted to activate switch means in said electric power supply means to close said switch means upon moving in a first direction and to open said switch means upon moving in a second direction, and biasing means adapted to urge said auxiliary member in said second direction.

Conveniently, the latching means includes an electromagnetic holding device which is adapted to hold said auxiliary member against force applied by said biasing means when said electromagnetic holding device is activated. Upon completion of said toasting cycle, the electromagnetic holding device is deactivated and releases said auxiliary member to thereby open the switch means in said electric power supply means. In this manner, power supply is prevented to the heating element means upon completion of the toasting cycle regardless of the position of the product supporting carriage. Thus the product supporting carriage can be held down jammed by the product being toasted, by other mechanical failure, by intervention by a person or any other extraordinary situation but the power supply to the heating element means is immediately discontinued to thereby minimize the risks of fires or electrical accidents as discussed above Moreover, with an arrangement as discussed above, it is also possible to include sensing means to sense at least one abnormal condition in the toaster and to deactivate the electromagnetic holding device of said latching means immediately upon said abnormal condition being sensed. The abnormal condition might be, for example, an over temperature condition, a flame condition or a condition indicative of an abnormal current leakage from the heating element means such as might occur with insertion and contact of a conducting utensil with the heating element means while the heating element means remain electrically live.

Such abnormal current leakage may be sensed by a Residual Current Device (RCD) that is arranged to sense an imbalance of currents in the active and neutral wires of the electric circuit leads supplying power to the heating element means. An earth leakage circuit breaker device could also be used but is less preferred as some earth leakage current may exist in the earth wire which is not necessarily caused by "abnormal" conditions. More particularly, it is possible for a current path to be established through a person and not through the earth wire when a person contacts the element or other conductive part of the toaster. Devices of the aforementioned kind are known in the art and will not be further described hereinafter.

Advantageously, a stop means is provided preventing the main carriage from being lowered to a position whereby the carriage itself could restrict upward movement of the auxiliary member upon deactivation of the latch means. Conveniently movement of the carriage in a downward direction also activates auxiliary switch means of any desired configuration to connect the electromagnetic holding device to power prior to the auxiliary member contacting same.

DESCRIPTION OF THE PREFERRED EMBODIMENTS

Figure 1:
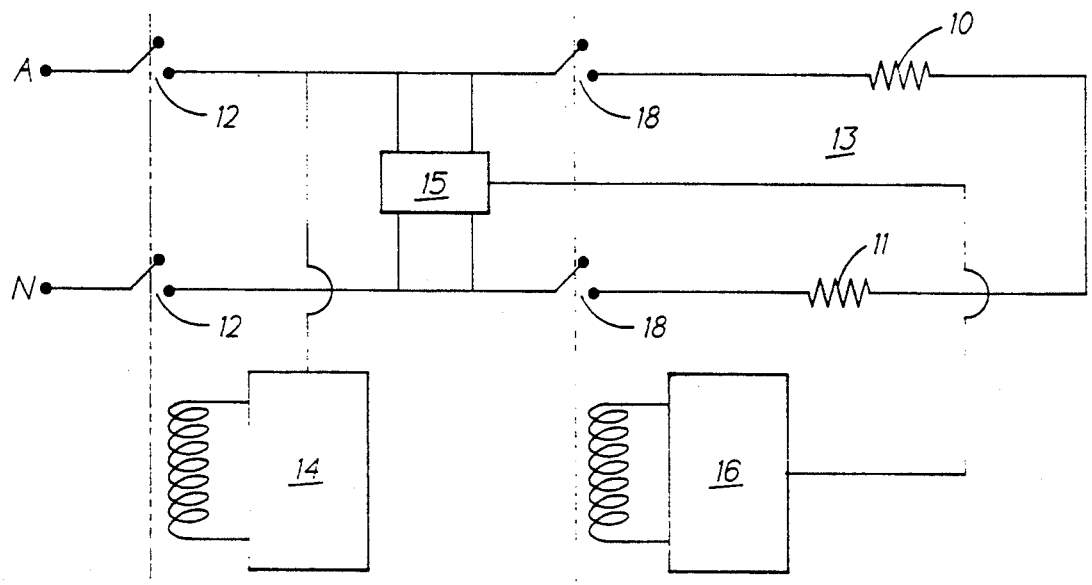
FIG. 1 is a schematic circuit diagram of a toaster configured according to a preferred embodiment of one aspect of the present invention.

Referring to FIG. 1 of the drawings, a toaster circuit diagram is illustrated schematically. The toaster may include heating elements 10,11 on either side of a toasting compartment 13, with the elements 10, 11 being arranged electrically in series. It will of course be appreciated that the present invention is also applicable to parallel circuit type toasters. A product supporting carriage (not shown) is provided (as is conventional with many toasters) to support a slice of bread or other product to be toasted as the product is lowered to a toasting position between the elements 10, 11. A first double pole switch 12 is provided as a main power supply switch to provide power to the elements 10, 11. The switch 12 is operated by an electromagnetic latching device 14 but any other latching mechanism could be used. The switch 12 is normally open but i tripped closed by movement of the product carriage to the toasting position and is thereafter held closed by the electromagnetic latching device 14 for a desired toasting cycle. A residual current sensing device 15 (of any desired configuration) is provided to sense an imbalance of current in the active and neutral wires to the heating elements 10, 11. The sensing device 15 delivers a signal to an electromagnetic device 16 which is activated to open a second double pole switch 18 if an abnormal condition is sensed. Thus if the product carriage is maintaining the first double pole switch 12 closed and an abnormal current leakage occurs (e.g. by a person inserting a conducting element into the toasting compartment and contacting an electrically live circuit part), the device 15 senses this and through the latching device 16, opens the switch means 18.

Figure 2:
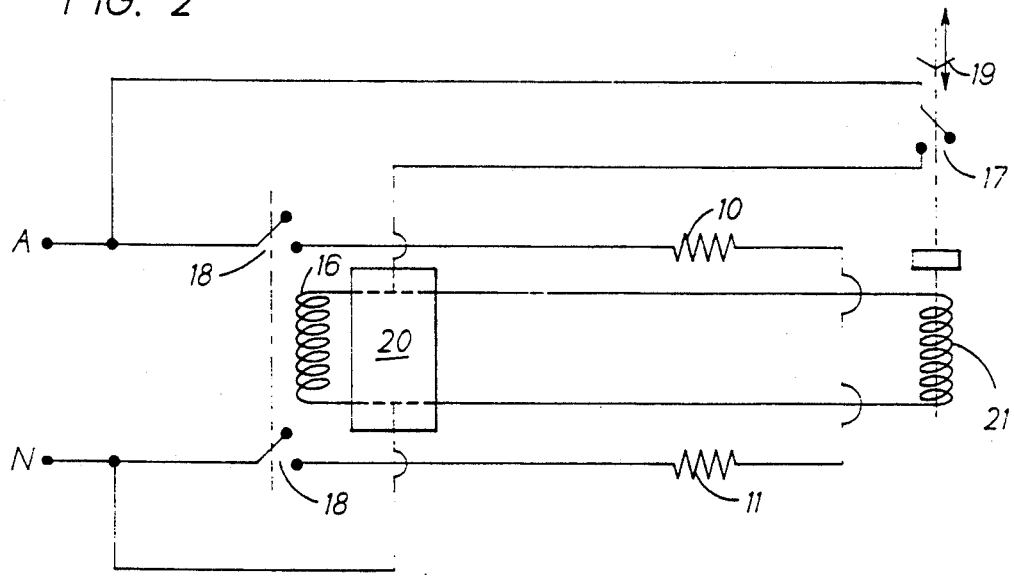
FIG. 2 is a schematic circuit diagram of a toaster configured according to a second preferred embodiment.

FIG. 2 illustrates a further preferred embodiment where an auxiliary switch 17 is closed or opened by downward or upward movement respectively of the product supporting carriage 19. The switch 17 supplies power to a sensing device 20 which may be an RCD sensor, a flame sensor, an over temperature sensor or any other condition sensing device, or in fact a combination of any one or more of these devices. The sensing device 20 may also include a normal toasting cycle control (either a timer, color sensor, or any other normal cycle control) The device 20 provides power to an electromagnetic latching device 16 which closes a normally open double pole switch 18 to connect the heating elements 10, 11 to a power supply during a normal toasting cycle. At the end of the normal cycle, the device 20 disconnects power to the electromagnetic device 16 to open the switch 18. Similarly, if the device 20 senses any abnormal condition, power is disconnected from the device 16 to open the switch 18. The device 20 also provides power (only during a normal toasting cycle) to an electromagnetic latch 21 to hold the carriage 19 down in the toasting position. Once the normal toasting cycle is completed (either by timing, color sensing control of the product toasted or otherwise), power is removed from the latch 21 to allow the carriage to move upwardly to also open the auxiliary switch 17.

Figure 3:
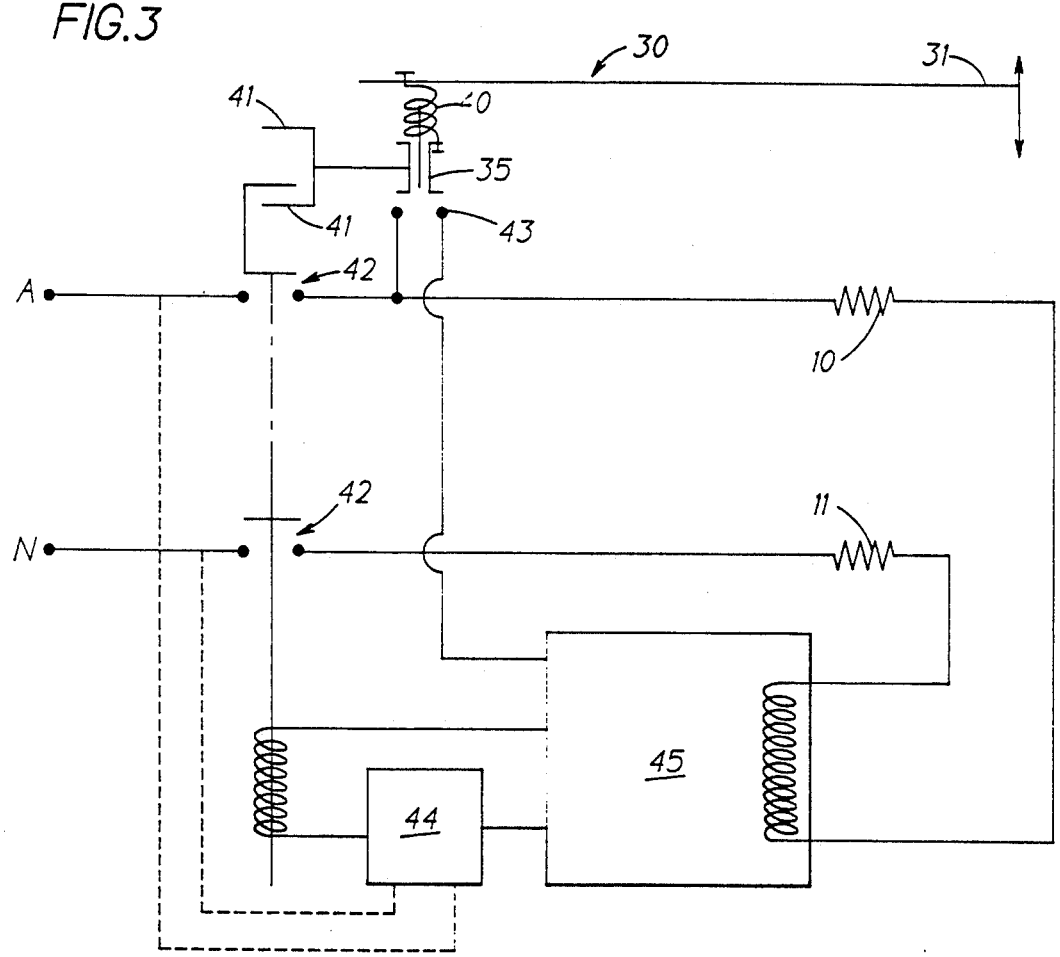
FIG. 3 is a schematic circuit diagram of a toaster configured according to a third preferred embodiment.
Figure 4:
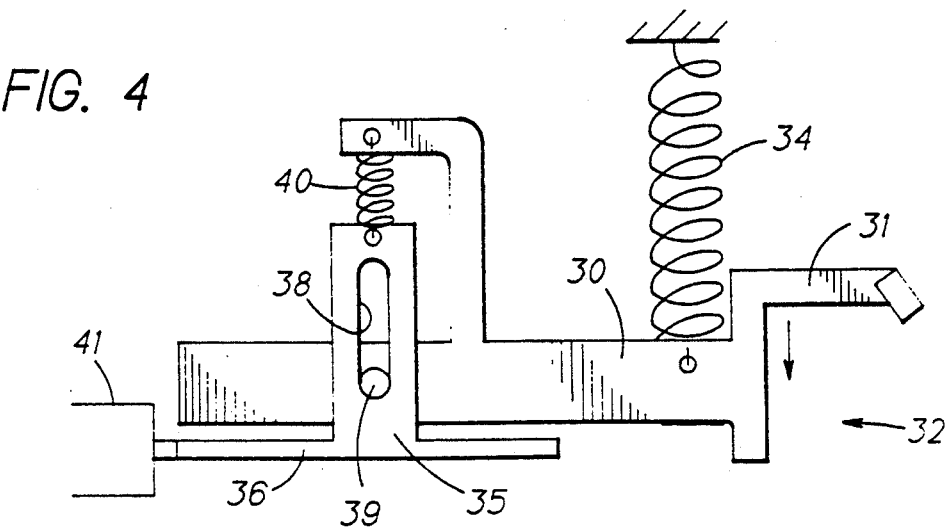
FIG. 4 is a schematic illustration of a form of construction embodying features illustrated in FIG. 3.
Figure 4:
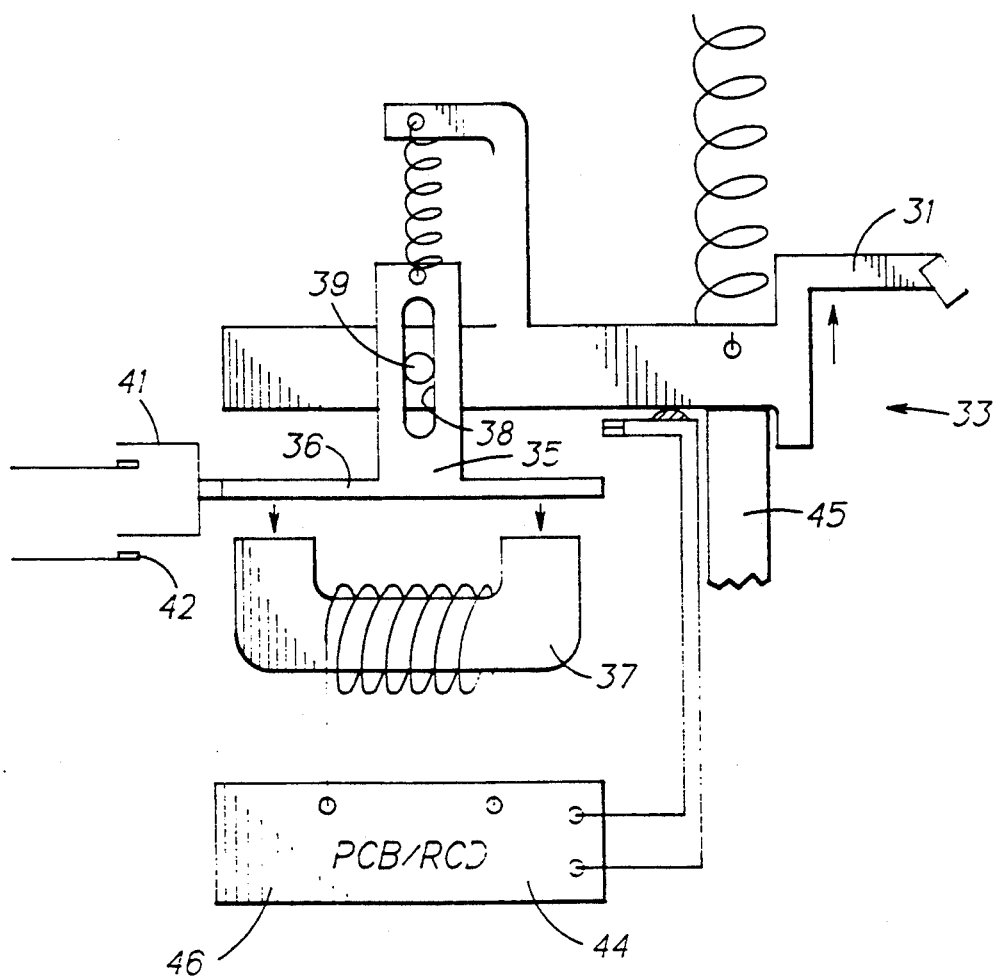

FIGS. 3 and 4 illustrate a still further preferred embodiment where FIG. 3 comprises a schematic circuit diagram and FIG. 4 illustrates schematically one physical embodiment. The main product supporting carriage 30 is conveniently supported at at least one end 31 for movement in a generally vertical direction from an elevated product (to be toasted) receiving position illustrated at 32 to a lowered toasting position illustrated at 33. The carriage naturally would include a product support arm (not shown) which would position the product, in the toasting position, in the toasting compartment 13 to receive heat from heating elements 10, 11 (not shown in FIG. 4). Typically the toaster might be a conventional arrangement with the product to be toasted being introduced through an upper slot providing access to the toasting compartment 13 with a heating element 10, 11 of any desired type on either side of the vertically arranged toasting compartment. Naturally, other toaster configurations embodying the present invention, could also be used.

A main carriage spring 34 acts between the carriage 30 and a chassis of the toaster tending to urge the carriage towards the elevated position 32. An auxiliary member 35 is carried by the carriage 30 having a lower part 36 adapted to be drawn to and retained by an electromagnetic latching device 37 located adjacent the lowered position 33. The member 35 conveniently includes a central slot 38 sliding on and retained by a pin 39 fixed to the carriage 30. Naturally any other suitable form of lost motion mechanism could be employed to retain the member 35 for bodily movement with the carriage 30 but permitting the member 35 to move vertically relative to the carriage 30 within defined limits (defined by the length of the slot 38 in the illustrated embodiment). The auxiliary member 35 is urged by spring means 40 in an upward direction and as shown in the position 32, is at its uppermost position relative to the carriage 30. The auxiliary member 35 also carries contacts 41 adapted to open or close a main power supply switch 42 to provide power (when closed) to the heating elements (not shown).

An auxiliary switch means 43 is illustrated, the contacts of which are normally open, but which are closed by contact with the carriage 30 when it has been moved to, or closely adjacent to, its lower position illustrated at 33. When the auxiliary switch means 43 is closed power is supplied to the printed circuit board 46 which may include a number of control features discussed below, but which also supplies power to the electromagnetic latch device 37 to activate same which attracts and hold auxiliary member 35 thereto. In moving to this held position, the contacts 41 also move to close the power supply switch means 42 to supply power to the heating elements. A physical stop means 45 is provided to limit the downward travel of the carriage 30 so that it does not normally move to a position whereby it can obstruct sufficient upward movement of the member 35 upon the electromagnetic latch being deactivated.

The printed circuit board (PCB) 46 would normally include suitable control elements to control the toasting cycle during normal operation such as timers or color control systems. Moreover other safety control elements could be utilized such as fire detectors which would deactivate the electromagnetic latch upon a predetermined fault condition being sensed. Naturally the PCB 46 will include a sensing device to sense any abnormal current leakage from the heating element conductors and to immediately deactivate the latching means 37 upon such a condition being detected. The sensing means is preferably a residual current device (RCD) 44 as previously discussed. Rather than using a printed circuit board, separate devices might be employed as described above.

In operation, when a product to be toasted (such as a bread slice) is placed onto the support carriage 30, the carriage is moved manually from the upper position 32 to the lowered position 33 against the spring 34. At position 33, the stop 45 has been engaged and further downward carriage movement is prevented The auxiliary switch 43 has also been closed supplying power to the electromagnetic latch 37 and the auxiliary member 35 is drawn thereby down thereon to be held in this position with the pin 19 substantially at the upper end of the slot 38. Thus the carriage 30 and the member 35 are held in this position for as long as the latching device is activated. During this downward movement of the auxiliary member 35, the contacts 41 close the power supply switch 42. Conveniently this closing occurs before the member 35 is engaged on the latching device 37.

In normal operation, when the toasting cycle is completed, power is removed from the latching device and the member 35 moves upwardly (to the position shown at 32) relative to the carriage 30 and the carriage 30 also moves upwardly under action of the spring 34. With the member 35 moving upwardly, power is removed from the heating elements 10, 11 by opening the main power supply switch 42. If abnormal conditions are sensed by any sensing device supplied (e.g. an RCD device 44, fire or flame detector, over temperature device or any other similar device), then again power is removed from the latching device 37 and power is immediately removed from the heating elements and other relevant conducting parts of the toaster. Moreover, because the auxiliary member 35 is locatable in a position where it cannot become occasionally jammed by the product being toasted, immediately upon completion of a toasting cycle, the member 35 is released by the device 37 and moves upwardly to open the contacts 42 and discontinue power to the elements 10, 11.

While preferred embodiments of the invention have been described and illustrated, the invention should not be otherwise embodied within the scope of the following claims:

What is claimed is:

1. An electric toaster comprising a toasting compartment, electrically operated heating element means adapted to direct heat to said toasting compartment when activated, electric power supply means including switch means adapted to provide power to said heating element means during a toasting cycle, product supporting carriage means adapted to move a product to be toasted into said toasting compartment, latching means to retain said carriage means in a toasting position during said toasting cycle, said carriage means including an auxiliary member carried thereby, said auxiliary member being adapted to activate said switch means to close said switch means upon moving in a first direction and to open said switch means upon moving in a second direction, and sensor means adapted to detect any abnormal condition during said toasting cycle in response thereto move said auxiliary member in said second direction to open said switch means.

2. An electric toaster according to claim 1, wherein said sensor means is adapted to detect an over temperature condition in said toasting compartment.

3. An electric toaster according to claim 1, wherein the sensor means is a device for detecting an imbalance of currents in active and neutral wires of the electric power supply means indicative of an abnormal current leakage from said heating element means.

4. An electric toaster according to claim 3, wherein the auxiliary member is arranged for movement relative to said carriage means.

5. An electric toaster according to claim 4, wherein biasing means is provided to normally urge said auxiliary member in said second direction.

6. An electric toaster according to claim 5, wherein said carriage means moves in said first direction when a product to be toasted is moved into said toasting compartment.

7. An electric toaster according to claim 1, wherein the auxiliary member is arranged for movement relative to said carriage means.

8. An electric toaster according to claim 1 wherein said sensor means is adapted to detect a flame condition in said toasting compartment.

9. An electric toaster according to claim 1 wherein said sensor means is adapted to detect an abnormal current leakage from the heating element means.

10. An electric toaster comprising a toasting compartment, electrically operated heating means adapted to direct heat to said toasting compartment when activated, electric power supply means including switch means adapted to provide electric power to said heating element means during a toasting cycle, product supporting carriage means adapted to move a product to be toasted into said toasting compartment, latching means to retain said carriage means in a toasting position during said toasting cycle, said carriage means including an auxiliary member carried thereby in a manner permitting movement relative to said carriage means, said auxiliary member being adapted to activate said switch means to close said switch means upon moving in a first direction and to open said switch means upon moving in a second direction, and biasing means adapted to urge said auxiliary member in said second direction.

11. An electric toaster according to claim 10, wherein said carriage means moves in said first direction when moving a product to be toasted into said toasting compartment.

12. An electric toaster according to claim 11, wherein said latching means includes an electromagnetic holding device adapted to hold said auxiliary member against force applied by said biasing means when said electromagnetic holding device is activated.

13. An electric toaster according to claim 12, wherein stop means is provided preventing the carriage means from being lowered into said toasting compartment beyond a position whereby the carriage means itself would restrict upward movement of the auxiliary member in said second direction upon deactivation of said latch means.

14. An electric toaster according to claim 13, further including auxiliary switch means to connect the electromagnetic holding device to said power supply prior to the auxiliary member contacting the latching means.

15. An electric toaster according to claim 10, wherein said latching means includes an electromagnetic holding device adapted to hold said auxiliary member against force applied by said biasing means when said electromagnetic holding device is activated.

16. An electric toaster according to claim 12, further including auxiliary switch means to connect the electromagnetic holding device to said power supply prior to the auxiliary member contacting the latching means.

* * * * *